US009365716B2

(12) United States Patent
Ueda

(10) Patent No.: US 9,365,716 B2
(45) Date of Patent: Jun. 14, 2016

(54) THERMOPLASTIC RESIN COMPOSITION AND SHAPED ARTICLE THEREFROM

(75) Inventor: Haruo Ueda, Kawasaki (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 611 days.

(21) Appl. No.: 12/666,487

(22) PCT Filed: Jul. 1, 2008

(86) PCT No.: PCT/JP2008/061918
§ 371 (c)(1),
(2), (4) Date: Dec. 23, 2009

(87) PCT Pub. No.: WO2009/005064
PCT Pub. Date: Jan. 8, 2009

(65) Prior Publication Data
US 2010/0324174 A1    Dec. 23, 2010

(30) Foreign Application Priority Data
Jul. 2, 2007    (JP) .................. 2007-173827

(51) Int. Cl.
*C08L 63/00*   (2006.01)
*C08L 67/00*   (2006.01)
*C08L 61/06*   (2006.01)
*C08F 283/10*  (2006.01)
*C08L 67/02*   (2006.01)
*C08K 3/00*    (2006.01)
(Continued)

(52) U.S. Cl.
CPC .............. *C08L 67/02* (2013.01); *C08K 3/0033* (2013.01); *C08L 25/12* (2013.01); *C08L 63/04* (2013.01)

(58) Field of Classification Search
USPC ........................................... 523/400
See application file for complete search history.

(56) References Cited

U.S. PATENT DOCUMENTS 6,252,002 B1 * 6/2001 Yamada .................. C08L 33/12
                                                   525/226
6,423,767 B1 * 7/2002 Weber ..................... C08K 5/092
                                                   524/158

(Continued)

FOREIGN PATENT DOCUMENTS

JP    6 212065    8/1994
JP    7-62209     3/1995
(Continued)

OTHER PUBLICATIONS

Shirai et al., Computer generated English translation of JP 06-212065 A, Aug. 2, 1994.*

*Primary Examiner* — David Karst
(74) *Attorney, Agent, or Firm* — Oblon, McClelland, Maier & Neustadt, L.L.P.

(57) ABSTRACT

Disclosed are a thermoplastic resin composition which has a reduced tendency to mold staining while being shaped and a high flowability, and a shaped article which, when used as a lamp component, has good surface appearance and generates little volatiles by the heat of the lamp. Specifically disclosed are a thermoplastic resin composition containing a polyester resin (A), a cresol novolac epoxy resin (B), and a vinyl cyanide-aromatic vinyl copolymer containing epoxy group (C), and a shaped article shaped therefrom, wherein the cresol novolac epoxy resin (B) and the vinyl cyanide-aromatic vinyl copolymer containing epoxy group (C) are compounded in amounts of 0.01 to 3 parts by mass and 2 to 12 parts by mass, respectively, relative to 100 parts by mass of the polyester resin (A).

18 Claims, 1 Drawing Sheet

(51) Int. Cl.
*C08L 25/12* (2006.01)
*C08L 63/04* (2006.01)

(56) References Cited

U.S. PATENT DOCUMENTS

| | | | |
|---|---|---|---|
| 6,777,512 B1* | 8/2004 | Sonnenschein | C09J 4/00 156/306.9 |
| 2002/0013387 A1* | 1/2002 | Weier | C08F 265/04 523/201 |
| 2004/0254272 A1* | 12/2004 | Ando | C08F 2/00 524/107 |
| 2006/0291215 A1 | 12/2006 | Shirai et al. | |

FOREIGN PATENT DOCUMENTS

| | | |
|---|---|---|
| JP | 9-296095 | 11/1997 |
| JP | 2001 316573 | 11/2001 |
| JP | 2002-138135 A | 5/2002 |
| JP | 2002-294050 A | 10/2002 |
| JP | 2003-12903 | 1/2003 |
| WO | WO 02/12393 A1 | 2/2002 |
| WO | WO 2007/083655 A1 | 7/2007 |

* cited by examiner

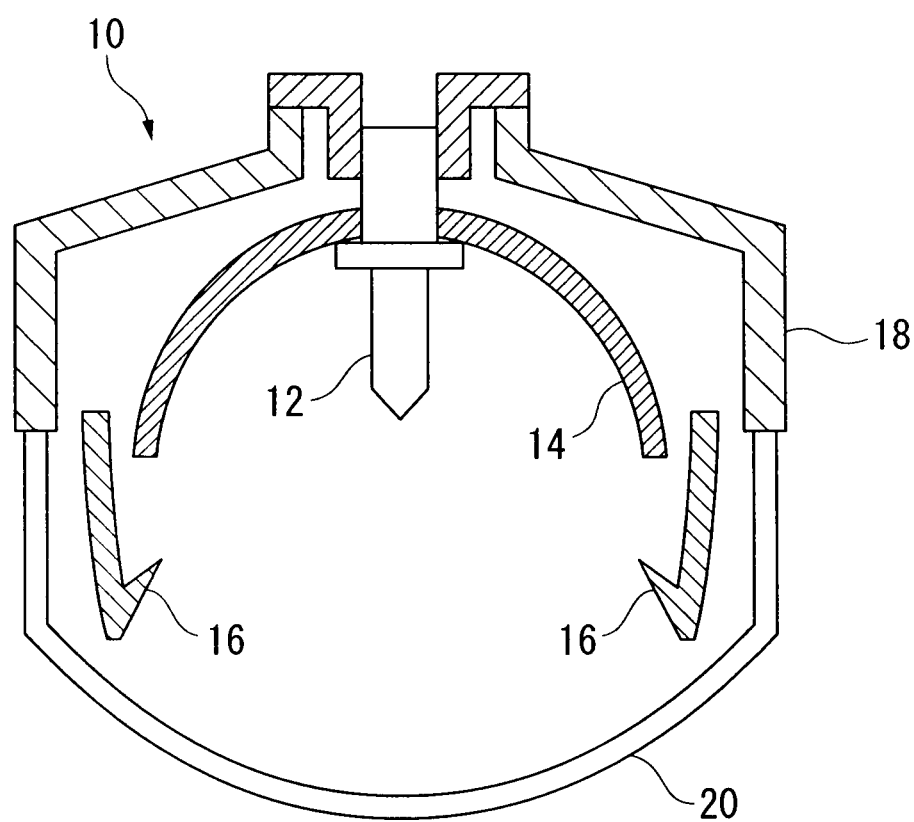

THERMOPLASTIC RESIN COMPOSITION AND SHAPED ARTICLE THEREFROM

TECHNICAL FIELD

The present invention relates to a thermoplastic resin composition and a shaped article shaped therefrom.

The present application claims the priority of Japanese Patent Application No. 2007-173,827 filed on Jul. 2, 2007, the contents of which are incorporated herein by reference.

BACKGROUND ART

Vehicle lamp components such as housings, reflectors, and extensions, which compose vehicle lamps such as head lamps and turn signal lamps of automobile, are exposed to a temperature of 160 to 180° C. by heat generated from light sources. Consequently, when the vehicle lamp components are used for a long time, it sometimes happens that thermal decomposition products sublimate from the vehicle lamp components, adhere to lenses of the vehicle lamps, and thereby cause fogging of the lenses.

In addition, a direct- or pre-treatment, or a further treatment such as coating is applied on the vehicle lamp components, depending on a purpose. In view of design, high gloss is required for the vehicle lamp components, in particular for extensions (decorative boards around reflectors), on which the foregoing treatment has been applied. Therefore, high degree surface appearance is also required for the vehicle lamp components before the foregoing treatment is performed (base materials).

As the thermoplastic resin composition from which good vehicle lamp components being suppressed in fogging and having good surface appearance can be obtained, the following has been proposed:

a polyester resin composition comprising 100 parts by mass of a thermoplastic polyester resin (A), 5 to 50 parts by mass of an epoxy group-containing material (B), and 0.1 to 50 parts by mass of a reinforcement material (Patent Document 1).

The thermoplastic resin composition described in Patent Document 1, however, needs further improvement in the use where the shaped article is subjected to direct vapor deposition, although mold-staining hardly occurs at the time of shaping and surface appearance of the shaped article (a vehicle lamp component) is improved.

Patent Document 1: Japanese Patent Application Laid-Open No. 2001-316,573

DISCLOSURE OF INVENTION

Problem to be Solved by the Invention

It is an object of the present invention to provide a thermoplastic resin composition having a reduced tendency to mold staining which causes deterioration of surface appearance, and a high flowability. It is another object of the present invention to provide a shaped article (a vehicle lamp component) having surface appearance capable of direct vapor deposition.

Means for Solving the Problem

The thermoplastic resin composition of the present invention comprises:
a polyester resin (A);
a cresol novolac epoxy resin (B); and
a vinyl cyanide-aromatic vinyl copolymer containing epoxy group (C),
wherein a compounding amount of the cresol novolac epoxy resin (B) is 0.01 to 3 parts by mass and a compounding amount of the vinyl cyanide-aromatic vinyl copolymer containing epoxy group (C) is 2 to 12 parts by mass, relative to 100 parts by mass of the polyester resin (A).

The thermoplastic resin composition of the present invention preferably further comprises a (meth)acrylate resin (D) in a compounding amount of 0.1 to 10 parts by mass relative to 100 parts by mass of the polyester resin (A).

The thermoplastic resin composition of the present invention preferably further comprises an inorganic filler (E) in a compounding amount of 0.1 to 45 parts by mass relative to 100 parts by mass of the polyester resin (A).

The shaped article of the present invention is shaped from the thermoplastic resin composition of the present invention.

The shaped article of the present invention is preferably a vehicle lamp component.

Effect of the Invention

The thermoplastic resin composition of the present invention has a reduced tendency to mold staining which causes deterioration of surface appearance, and a high flowability.

The shaped article of the present invention has surface appearance capable of being subjected to direct vapor deposition.

BRIEF DESCRIPTION OF DRAWINGS

FIG. 1: A cross sectional diagram illustrating an example of an automobile head lamp.

EXPLANATION OF NUMERALS

14: Reflector (shaped article)
16: Extension (shaped article)
18: Housing (shaped article)

BEST MODE FOR CARRYING OUT THE INVENTION

In the present description (meth)acrylate means acrylate or methacrylate.

<Thermoplastic Resin Composition>

The thermoplastic resin composition of the present invention contains a polyester resin (A), a cresol novolac epoxy resin (B), and a vinyl cyanide-aromatic vinyl copolymer containing epoxy group (C), and optionally contains a (meth)acrylate resin (D), an inorganic filler (E), or another additive, when necessary.

(Polyester Resin (A))

As the polyester resin (A), a polyester obtained by condensation polymerization of an aromatic or alicyclic dicarboxylic acid, or a derivative thereof with a diol can be mentioned.

As the dicarboxylic acid, for example, terephthalic acid, isophthalic acid, naphthalene dicarboxylic acid, and cyclohexane dicarboxylic acid can be mentioned.

As the diol, for example, an alkylene diol having a methylene chain with 2 to 6 carbon atoms such as ethylene glycol, diethylene glycol, propane diol, and butane diol, cyclohexane dimethanol, and an adduct of 2 moles of ethylene oxide and/or propylene oxide to bisphenol A can be mentioned.

Specific examples of the polyester resin (A) include polyethylene terephthalate, polybutylene terephthalate, polyethylene naphthalate, and polybutylene naphthalate. The polyester resin (A) can be used alone or in a combination of two or more kinds thereof.

As the polyester resin (A), a combination of polybutylene terephthalate (a-1) and polyethylene terephthalate (a-2) is preferable in view of flowability of the resulting thermoplastic resin composition, appearance of the resulting shaped article, and economy.

The lower limit of the content of polybutylene terephthalate (a-1) is preferably 55% by mass or more, more preferably 60% by mass or more, and particularly preferably 70% by mass or more in 100% by mass of the polyester resin (A). The upper limit of the content of polybutylene terephthalate (a-1) is preferably 95% by mass or less, more preferably 90% by mass or less, and particularly preferably 85% by mass or less in 100% by mass of the polyester resin (A).

When the content of polybutylene terephthalate (a-1) is 55% by mass or more, the cycle time for shaping becomes short and thus the productivity becomes good, and when it is 95% by mass or less, the surface appearance of the shaped article becomes good.

The lower limit of the content of polyethylene terephthalate (a-2) is preferably 5% by mass or more, more preferably 10% by mass or more, and particularly preferably 15% by mass or more in 100% by mass of the polyester resin (A). The upper limit of the content of polyethylene terephthalate (a-2) is preferably 45% by mass or less, more preferably 40% by mass or less, and particularly preferably 30% by mass or less in 100% by mass of the polyester resin (A).

When the content of polyethylene terephthalate (a-2) is 5% by mass or more, the surface appearance of the shaped article becomes good, and when it is 45% by mass or less, the cycle time for shaping becomes short and thus the productivity becomes good.

The polybutylene terephthalate (a-1) may be a homopolymer of a butylene terephthalate unit or a copolymer which contains 70% by mass or more of butylene terephthalate units in 100% by mass of repeating units of the copolymer.

As the constituent monomer to be copolymerized, the following monomers can be mentioned: dicarboxylic acids other than terephthalic acid and derivatives thereof, such as aromatic or aliphatic polybasic acids like isophthalic acid, naphthalene dicarboxylic acid, adipic acid, sebacic acid, trimellitic acid, and succinic acid; or esters thereof.

As diols other than 1,4-butanediol, alkylene glycols such as ethylene glycol, diethylene glycol, propylene glycol, trimethylene glycol, hexamethylene glycol, neopentyl glycol, cyclohexanedimethanol, and 1,3-octanediol; aromatic alcohols such as bisphenol A and 4,4'-dihydroxy biphenyl; alkylene oxide adducts of alcohols such as an adduct of 2 moles of ethylene oxide to bisphenol A and an adduct of 2 moles of propylene oxide to bisphenol A; and polyhydroxy compounds such as glycerine and pentaerythritol and ester forming derivatives thereof can be mentioned.

The reduced viscosity ($\eta sp/C$) of the polybutylene terephthalate (a-1) at 25° C. is preferably 0.7 or more, more preferably 0.8 or more, and particularly preferably 0.9 or more. The reduced viscosity ($\eta sp/C$) of the polybutylene terephthalate (a-1) at 25° C. is preferably 2.0 or less, more preferably 1.7 or less, and particularly preferably 1.5 or less.

When the reduced viscosity is 0.7 or more, strength of the resulting shaped article becomes good. When the reduced viscosity is 2.0 or less, flowability of the resulting thermoplastic resin composition and appearance of the resulting shaped article become good.

The reduced viscosity is an index of molecular weight and measured with an Ubbelohde type viscometer.

The polyethylene terephthalate (a-2) may be a homopolymer of an ethylene terephthalate unit or a copolymer which contains 70% by mass or more of ethylene terephthalate units in 100% by mass of repeating units of the copolymer.

As the constituent monomer to be copolymerized, the following monomers can be mentioned: as dicarboxylic acids other than terephthalic acid and derivatives thereof, aromatic or aliphatic polybasic acids such as isophthalic acid, naphthalene dicarboxylic acid, adipic acid, sebacic acid, trimellitic acid, and succinic acid, or esters thereof.

As diols other than ethylene glycol, alkylene glycols such as diethylene glycol, propylene glycol, butylene glycol, hexamethylene glycol, neopentyl glycol, cyclohexanedimethanol, and 1,3-octanediol; aromatic alcohols such as bisphenol A and 4,4'-dihydroxy biphenyl; alkylene oxide adducts of alcohols such as an adduct of 2 moles of ethylene oxide to bisphenol A and an adduct of 2 moles of propylene oxide to bisphenol A; and polyhydroxy compounds such as glycerine and pentaerythritol and ester forming derivatives thereof can be mentioned.

The intrinsic viscosity ($[\eta]$) of the polyethylene terephthalate (a-2) is preferably 0.4 or more, more preferably 0.5 or more, and particularly preferably 0.6 or more. The intrinsic viscosity ($[\eta]$) of the polyethylene terephthalate (a-2) is preferably 1.2 or less, more preferably 1.1 or less, and particularly preferably 1.0 or less.

When the intrinsic viscosity is 0.4 or more, strength of the resulting shaped article becomes good. When the intrinsic viscosity is 1.2 or less, flowability of the resulting thermoplastic resin composition and appearance of the resulting shaped article become good.

The intrinsic viscosity is an index of molecular weight and measured with an Ubbelohde type viscometer.

The amount of the polyester resin (A) is preferably 80% by mass or more, more preferably 85% by mass or more, and particularly preferably 90% by mass or more in 100% by mass of the thermoplastic resin composition in view of flowability of the resulting thermoplastic resin composition, heat resistance and mold releasability of the resulting shaped article. The amount of the polyester resin (A) is preferably 98% by mass or less, more preferably 97% by mass or less, and particularly preferably 95% by mass or less in 100% by mass of the thermoplastic resin composition in view of surface appearance and surface flatness of the resulting shaped article.

(Cresol Novolac Epoxy Resin (B))

The cresol novolac epoxy resin (B) is a resin expressed by the following formula (1).

Formula (1)

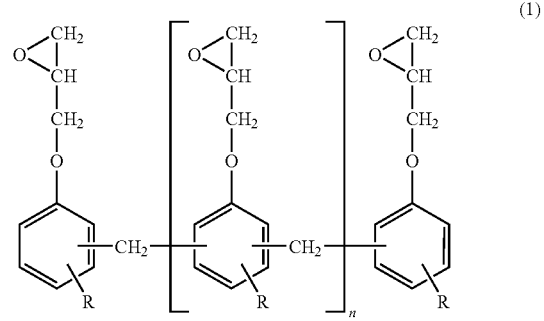

In the formula, R represents a methyl group bonding to ortho- or para-position and n represents a repeating number.

The number average molecular weight of the cresol novolac epoxy resin (B) is preferably 500 to 7,000. When the number average molecular weight of the cresol novolac epoxy resin (B) is 500 or more, a tendency to mold staining of the resulting thermoplastic resin composition becomes sufficiently low. It is difficult to produce a cresol novolac epoxy resin having the number average molecular weight that exceeds 7,000.

The number average molecular weight of the cresol novolac epoxy resin is a mass average molecular weight which is measured by gel permeation chromatography (GPC) and is based on polystyrene.

The epoxy equivalent of the cresol novolac epoxy resin (B) is preferably 176 to 280.

The compounding amount of the cresol novolac epoxy resin (B) is 0.01 part by mass or more, preferably 0.03 part by mass or more, and more preferably 0.05 part by mass or more relative to 100 parts by mass of the polyester resin (A). The compounding amount of the cresol novolac epoxy resin (B) is 3 parts by mass or less, preferably 2.5 parts by mass or less, and more preferably 1 part by mass or less relative to 100 parts by mass of the polyester resin (A).

When the compounding amount of the cresol novolac epoxy resin (B) is 0.01 part by mass or more, generation of gases at the time of heating is reduced and thus a tendency to mold staining of the resulting thermoplastic resin composition is reduced. When the compounding amount of the cresol novolac epoxy resin (B) is 3 parts by mass or less, flowability of the resulting thermoplastic resin composition becomes good.

(Vinyl Cyanide-Aromatic Vinyl Copolymer Containing Epoxy Group (C))

The vinyl cyanide-aromatic vinyl copolymer containing epoxy group (C) is a copolymer having vinyl cyanide units, aromatic vinyl units, and epoxidized vinyl units. The vinyl cyanide-aromatic vinyl copolymer containing epoxy group (C) improves mold releasability of the resulting shaped article, lowers shrinkage rate of the resulting shaped article at the time of shaping, and improves surface appearance of the resulting shaped article.

As the vinyl cyanide, acrylonitrile, methacrylonitrile, ethacrylonitrile, fumaronitrile, and the like can be mentioned, and acrylonitrile is preferable.

As the aromatic vinyl, styrene, α-methyl styrene, o-methyl styrene, 1,3-dimethyl styrene, p-methyl styrene, t-butyl styrene, halogenated styrene, p-ethyl styrene, and the like can be mentioned and styrene is preferable.

As the epoxidized vinyl, glycidyl methacrylate and glycidyl acrylate can be mentioned and glycidyl methacrylate is preferable.

In the vinyl cyanide-aromatic vinyl copolymer containing epoxy group (C), a vinyl cyanide-aromatic vinyl copolymer may be included in view of formability or a vinyl cyanide-aromatic vinyl copolymer containing maleimide skeleton may be included in view of heat resistance of the resulting shaped article.

When the vinyl cyanide-aromatic vinyl copolymer containing epoxy group (C) and the (meth)acrylate resin (D) are used in combination, surface flatness and gloss of the resulting shaped article are improved by synergy effect. In addition, the vinyl cyanide-aromatic vinyl copolymer containing epoxy group (C) has the effect of reducing thermal decomposition products generating from additives such as the (meth)acrylate resin (D) as well as thermal decomposition products from the polyester resin (A).

The vinyl cyanide-aromatic vinyl copolymer containing epoxy group (C) is a copolymer having vinyl cyanide units, aromatic vinyl units, and epoxy group-containing monomer units.

As the epoxy group-containing monomer, glycidyl methacrylate, glycidyl acrylate, and the like can be mentioned.

The content of the vinyl cyanide units is preferably 15 to 39.9% by mass and more preferably 15 to 29.8% by mass in 100% by mass of the vinyl cyanide-aromatic vinyl copolymer containing epoxy group (C). The content of the aromatic vinyl units is preferably 60 to 84.9% by mass and more preferably 70 to 84.8% by mass in 100% by mass of the vinyl cyanide-aromatic vinyl copolymer containing epoxy group (C).

The content of the epoxy group-containing monomer units is preferably 0.1 to 1.5% by mass and more preferably 0.2 to 1.2% by mass in 100% by mass of the vinyl cyanide-aromatic vinyl copolymer containing epoxy group (C).

The vinyl cyanide-aromatic vinyl copolymer containing epoxy group (C) may have units of another monomer.

As the other monomer, an acrylate, a methacrylate, and the like can be mentioned.

The content of units of the other monomer is 24.9% by mass or less.

The mass average molecular weight of the vinyl cyanide-aromatic vinyl copolymer containing epoxy group (C) is preferably 30,000 to 200,000.

The mass average molecular weight of the vinyl cyanide-aromatic vinyl copolymer containing epoxy group (C) is a mass average molecular weight based on polystyrene to be measured by GPC.

The vinyl cyanide-aromatic vinyl copolymer containing epoxy group (C) can be produced by a conventional polymerization method such as a suspension polymerization method, emulsion polymerization method, solution polymerization method, and bulk polymerization method.

The compounding amount of the vinyl cyanide-aromatic vinyl copolymer containing epoxy group (C) is from 2 to 12 parts by mass relative to 100 parts by mass of the polyester resin (A). The lower limit of the compounding amount is preferably 2.5 parts by mass or more and more preferably 3 parts by mass or more; the upper limit of the compounding amount is preferably 10 parts by mass or less and more preferably 9 parts by mass or less.

When the compounding amount of the vinyl cyanide-aromatic vinyl copolymer containing epoxy group (C) is 2 parts by mass or more, flowability of the resulting thermoplastic resin composition and shrinkage rate at the time of shaping become good, and when it is 12 parts by mass or less, surface appearance after heat resistance test is improved.

((Meth)acrylate Resin (D))

The (meth)acrylate resin (D) is a polymer having (meth)acrylate units as its main component. Surface appearance of the shaped article can be improved by addition of the (meth)acrylate resin (D).

The (meth)acrylate resin (D) gives excellent surface appearance and gloss, and further suppresses fogging caused by heat.

As the (meth)acrylate, for example, the one having a straight chain alkyl group, the one having a branched chain alkyl group, and the one having a cyclic alkyl group can be mentioned.

As the (meth)acrylate having a straight chain alkyl group, methyl(meth)acrylate, ethyl(meth)acrylate, n-butyl(meth)acrylate, lauryl(meth)acrylate, and stearyl (meth)acrylate can be mentioned.

As the (meth)acrylate having a branched chain alkyl group, 2-ethylhexyl(meth)acrylate can be mentioned.

As the (meth)acrylate having a cyclic alkyl group, cyclohexyl(meth)acrylate can be mentioned.

These (meth)acrylates can be used alone or in a combination of two or more kinds thereof.

As the (meth)acrylate resin (D), a polymer having methyl methacrylate units is preferable. The content of methyl methacrylate units is preferably 30% by mass or more and more preferably 40% by mass or more in 100% by mass of the (meth)acrylate resin (D). The content of methyl methacrylate units is preferably 90% by mass or less and more preferably 70% by mass or less in 100% by mass of the (meth)acrylate resin (D).

The (meth)acrylate resin (D) may have units of another monomer.

As the other monomer, an aromatic vinyl such as styrene, α-methyl styrene, chlorostyrene, and vinyl toluene; a vinyl cyanide such as acrylonitrile and methacrylonitrile; a vinyl ester such as vinyl acetate; a dicarboxylic acid anhydride such as maleic anhydride; and a polyfunctional monomer such divinylbenzene and allyl methacrylate can be mentioned. The other monomers can be used alone or in a combination of two or more kinds thereof.

The mass average molecular weight of the (meth)acrylate resin (D) is preferably 600,000 or more in view of appearance of the resulting shaped article.

The mass average molecular weight of the (meth)acrylate resin (D) is a mass average molecular weight which is measured by GPC and is based on polystyrene.

The content of the (meth)acrylate resin (D) is preferably 0.1 part by mass or more, more preferably 0.5 part by mass or more, and particularly preferably 1 part by mass or more relative to 100 parts by mass of the polyester resin (A). The content of the (meth)acrylate resin (D) is preferably 10 parts by mass or less, more preferably 5 parts by mass or less, and particularly preferably 3 parts by mass or less relative to 100 parts by mass of the polyester resin (A).

When the content of the (meth)acrylate resin (D) is 0.1 part by mass or more, surface appearance and gloss of the resulting shaped article become good, and when it is 10 parts by mass or less, flowability of the resulting thermoplastic resin composition and heat resistance of the resulting shaped article become good.

The (meth)acrylate resin (D) can be produced by a conventional polymerization method such as an emulsion polymerization method, suspension polymerization method, and solution polymerization method.

The (meth)acrylate resin (D) can be produced by, for example, the emulsion polymerization method having the following steps of:
(i) emulsifying a monomer mixture containing a (meth)acrylate in an aqueous medium in the presence of an emulsifier and a polymerization initiator to make an emulsion followed by polymerizing the monomer mixture to obtain a latex of a (meth)acrylate resin (D); and
(ii) recovering the (meth)acrylate resin (D) from the latex.

As the emulsifier, conventional emulsifiers can be mentioned such as anionic surfactants like aliphatic acid salts, alkyl sulfate salts, alkylbenzene sulfonate salts, alkyl phosphate salts, and dialkyl sulfosuccinate salts; nonionic surfactants like polyoxyethylene alkyl ethers, polyoxyethylene aliphatic acid esters, Sorbitan aliphatic acid esters, and glycerin aliphatic acid esters; and cationic surfactants like alkyl amine salts. These emulsifiers can be used alone or in a combination of two or more kinds thereof. An appropriate pH adjusting agent may be added to prevent the (meth)acrylate from hydrolyzing in the case where the emulsion becomes alkaline depending on the kind of emulsifier.

As the polymerization initiator, a water soluble or oil soluble initiator or a redox initiator can be mentioned.

As the water soluble initiator, an inorganic initiator such as persulfate or a redox initiator which is a combination of the inorganic initiator with a sulfite, hydrogensulfite, or tiosulfate can be mentioned.

As the oil soluble initiator, an initiator such as an organic peroxide like t-butyl hydroperoxide, cumenehydroperoxide, benzoyl peroxide, and lauroyl peroxide, and an azo compound, or a redox initiator which is a combination of the above initiator with sodium formaldehyde sulfoxylate can be mentioned.

The mass average molecular weight (Mw) and the molecular weight distribution (Mw/Mn) of the (meth)acrylate resin (D) are optionally adjustable by the choice of chain transfer agent such as n-octyl mercaptan or t-dodecyl mercaptan or by the selection of polymerization condition.

The latex of the (meth)acrylate resin (D) may be a mixture of two or more kinds thereof.

The method for recovering the (meth)acrylate resin (D) from the latex includes a coagulation method, spray-drying method, and freeze-drying method.

The coagulation method is a method of precipitating the (meth)acrylate resin (D) by coagulation by acid or salt and recovering the (meth)acrylate resin (D) in the state of powder by filtration, washing, and drying.

In the case where the latex is obtained by emulsion polymerization, the acid to be used in the coagulation by acid includes sulfuric acid, hydrochloric acid, and phosphoric acid, and the salt to be used in the coagulation by salt includes aluminum chloride, calcium chloride, magnesium sulfate, aluminum sulfate, and calcium acetate.

(Inorganic Filler (E))

The thermoplastic resin composition of the present invention may contain an inorganic filler (E) which enables to lower the shrinkage rate at the time of shaping of the resulting shaped article and to improve heat resistance in response to the demands for mold releasability and dimensional stability caused by the trend of larger size and more complicated shape of the shaped article. Further, the addition of the inorganic filler (E) enables to reduce the amount of the polyester resin (A) which causes mold-staining, without deteriorating the surface appearance of the shaped article.

Examples of the inorganic filler (E) include calcium carbonate, aluminum silicate, quartz, talc, mica, clay, hydrotalcite, graphite, glass bead, calcium sulfate, barium carbonate, barium sulfate, magnesium carbonate, magnesium sulfate, calcium silicate, titanium oxide, zinc oxide, magnesium oxide, silica, calcium titanate, magnesium titanate, barium titanate, white carbon, bentonite, zeolite, dromite, and sericite.

The refractive index of the inorganic filler (E) is preferably 1.61 or more, more preferably 1.62 or more, furthermore preferably 1.63 or more, and particularly preferably 1.64 or more. The refractive index of the inorganic filler (E) is preferably 2.5 or less, more preferably 2.45 or less, furthermore preferably 2.43 or less, and particularly preferably 2.40 or less.

When the refractive index is within the above range, gloss and appearance of the shaped article to be obtained when direct vapor deposition on the shaped article has been carried out become good.

As the inorganic filler (E) having the refractive index within the foregoing range, zinc sulfide (refractive index being 2.37 to 2.43), antimony oxide (refractive index being 2.09 to 2.29), zinc oxide (refractive index being 2.01 to 2.03), white lead (refractive index being 1.94 to 2.09), lithopone (refractive index being 1.84), basic zinc carbonate (refractive index being 1.70), magnesium oxide (refractive index being 1.64 to 1.74), barium sulfate (refractive index being 1.64 to 1.65), and barite powder (refractive index being 1.64 to 1.65) can be mentioned; barium sulfate is preferable in view of gloss and appearance of the shaped article and cost.

The kind of barium sulfate includes precipitated barium sulfate and barite powder, and precipitated barium sulfate is preferable in view of good appearance of the shaped article.

The refractive index of the inorganic filler (E) is measured by spectroscopy.

The upper limit of the average particle diameter of the inorganic filler (E) is preferably 3 μm or below, more preferably 1.5 μm or below, furthermore preferably 1 μm or below, furthermore preferably 0.7 μm or below, and particularly preferably 0.5 μm or below; it is preferably 0.01 μm or above, more preferably 0.03 μm or above, furthermore preferably 0.05 μm or above, and particularly preferably 0.1 μm or above.

When the average particle diameter of the inorganic filler (E) is 3 μm of below, appearance of the shaped article to be obtained when direct vapor deposition on the shaped article has been carried out becomes good. When the average particle diameter of the inorganic filler (E) is 0.01 μm or above, dispersibility of the inorganic filler (E) becomes good.

The average particle diameter of the inorganic filler (E) is measured by transmission electron microscopy.

The inorganic filler (E) may be subjected to a surface treatment so as to improve compatibility and dispersibility.

Examples of the surface treatment include treatment with a surface treatment agent, treatment with an aliphatic acid, and $SiO_2$—$Al_2O_3$ treatment. Examples of the surface treatment agent include an aminosilane coupling agent, epoxy silane coupling agent, titanate coupling agent, and aluminate coupling agent.

Precipitated barium sulfate subjected to $SiO_2$—$Al_2O_3$ treatment is preferable as the inorganic filler (E) in view of dispersibility. The barium sulfate subjected to $SiO_2$—$Al_2O_3$ treatment shows alkalinity, and a pH value thereof measured according to the boiling method of JIS K5101-26 shows around 8.0 or higher. The pH value varies depending on the method and the amount of the surface treatment; however, it is preferably 7.7 to 9.5, more preferably 7.8 to 9.0, and particularly preferably 7.9 to 8.0 in view of good dispersibility of the barium sulfate into the thermoplastic resin composition. When the pH value is 7.7 or higher, $SiO_2$—$Al_2O_3$ treatment becomes sufficient and appearance of the shaped article becomes good; when it is 9.5 or lower, hydrolysis of the polyester resin (A) is suppressed and thus deterioration of physical properties and generation of gases are suppressed.

The inorganic filler (E) can be compounded as a crystal nucleating agent for improvement of physical properties of the shaped article. The heat resistance, modulus of elasticity, and impact resistance of the shaped article are improved and thereby shaping cycle can be shortened by improvement of crystallinity of the polyester resin (A) at the time of shaping. As the crystal nucleating agent of crystal, talc is preferable.

The lower limit of the compounding amount of the inorganic filler (E) is preferably 0.1 part by mass or more, more preferably 2 parts by mass or more, furthermore preferably 3 parts by mass or more, and particularly preferably 4 parts by mass or more relative to 100 parts by mass of the polyester resin (A). The upper limit of the compounding amount of the inorganic filler (E) is preferably 45 parts by mass or less, more preferably 30 parts by mass or less, and particularly preferably 20 parts by mass or less relative to 100 parts by mass of the polyester resin (A).

When the compounding amount of the inorganic filler (E) is 0.1 part by mass or more, crystallinity of the polyester resin (A) is improved and heat resistance becomes good; when the compounding amount of the inorganic filler (E) is 2 parts by mass or more, shrinkage rate (linear shrinkage rate) of the resulting shaped article further becomes lowered. When the compounding amount of the inorganic filler (E) is 45 parts by mass or less, dispersibility of the inorganic filler (E) becomes good and surface appearance and flatness of the shaped article become good.

(Another Additive)

The thermoplastic resin composition of the present invention may contain a conventional additive such as lubricant, mold releasing agent, ultraviolet absorber, colorant, flame retardant, flame retarding aid, antioxidant, antistatic agent, coupling agent, foaming agent, cross-linking agent, crystal nucleating agent, and thermal stabilizer in such an amount that the object of the present invention is not impaired.

The thermoplastic resin composition of the present invention may contain another thermoplastic resin and a modifier in such an amount that the object of the present invention is not impaired.

Examples of the other thermoplastic resin include polycarbonate and polyamide.

The modifier is added to improve impact resistance, hydrolysis resistance, heat shock resistance, or the like of the shaped article. Examples of the modifier include a polyester elastomer, MBS, various rubbers such as butadiene rubber, acrylic rubber, silicone rubber, and silicone acrylic rubber, a polyolefin resin, and a polyamide resin.

The thermoplastic resin composition of the present invention explained above contains 0.01 part by mass or more of the cresol novolac epoxy resin (B) and the vinyl cyanide-aromatic vinyl copolymer containing epoxy group (C) relative to 100 parts by mass of the polyester resin (A), and hence the content of volatiles (a polyester oligomer, tetrahydrofuran (hereinafter referred to as THF), etc.) originated from the polyester resin (A) becomes low, and thus has a reduced tendency to mold staining. The reason of the low content of volatiles is presumed that end hydroxyl groups or carboxyl groups of the polyester resin (A) and an oligomer thereof react with epoxy groups of the cresol novolac epoxy resin (B) and the vinyl cyanide-aromatic vinyl copolymer containing epoxy group (C).

In addition, the resin composition more suitable for a material for lamp components can be obtained by the joint use of the cresol novolac epoxy resin (B) and the vinyl cyanide-aromatic vinyl copolymer containing epoxy group (C) which has the same effect as the cresol novolac epoxy resin (B) and can improve flowability.

<Shaped Article>

The shaped article of the present invention is a shaped article shaped from the thermoplastic resin composition of the present invention.

Examples of the shaped article include vehicle lamp components such as housings, reflectors, and extensions, which compose vehicle lamps such as head lamps and turn signal lamps of automobile, and lamp components such as lamp cases, which compose household lamps such as illumination lamps.

As the shaping method, a conventional shaping method such as an injection molding method can be mentioned.

Coloring (without painting), painting, indirect vapor deposition, direct vapor deposition, or the like may be applied to the shaped article in accordance with the use and purpose.

The procedure of the indirect vapor deposition is carried out by firstly applying primer treatment to the shaped article, then applying vapor deposition thereto, and finally applying top coat thereto.

The procedure of the direct vapor deposition is carried out by firstly applying vapor deposition to the shaped article without applying primer treatment or by firstly applying plasma treatment to the shaped article followed by applying vapor deposition thereto, and finally applying top coating or plasma treatment thereto.

FIG. 1 is a cross sectional diagram illustrating an example of an automobile head lamp (vehicle lamp). A head lamp 10 is equipped with a light source 12, a semispherical reflector 14 (shaped article) surrounding the rear portion of the light source 12, an extension 16 (shaped article) surrounding the circumferential portion of the reflector 14, a housing 18 (shaped article) accommodating the light source 12, the reflector 14 and the extension 16, and a lens 20 provided at the front portion of the housing 18.

The shaped article of the present invention explained above has a good surface appearance because it is shaped from the thermoplastic resin composition of the present invention which has a reduced tendency to mold staining and a high flowability. In other words, the surface flatness and appearance of the shaped article are secured by the use of the thermoplastic resin composition of the present invention because mold-staining and surface defects do not occur at the time of shaping.

The shaped article having a good surface appearance is suitable for vehicle lamp components, more suitable for extensions for which high gloss is desired in view of designability, and particularly suitable for extensions to which direct vapor deposition or coating, the finished result of which is deeply affected by the surface state of the shaped article, is applied.

Examples

Hereinafter, the present invention will be explained in more detail by examples. However, the present invention is not limited to these examples.
(Reduced Viscosity)

To 0.25 g of polybutylene terephthalate (a-1), 50 ml of a mixed solvent of phenol with tetrachloroethane (PTM-11, manufactured by Kanto Chemical Co., Inc.; phenol/1,2,2,2-tetrachloroethane being 1/1 (mass ratio)) was added to dissolve polybutylene terephthalate (a-1) at 140° C. for 10 to 30 minutes and to obtain a solution. The resulting solution was kept in a thermostatic water bath at 25° C. for 3 minutes to adjust its temperature, and passed through an Ubbelohde type viscometer, and a passing time between two marked lines was measured to obtain a reduced viscosity ($\eta sp/C$) using the following equation.

$$\eta sp/C = (\eta rel-1)/C = (T/T0-1)/C$$

Note that T represents the time (second) for the solution to pass through between the marked lines of a capillary tube, T0 represents the time (second) for the mixed solvent alone to pass through between the marked lines of the capillary tube, and C represents concentration of the sample (g/dL).

(Acid Value)
Polybutylene terephthalate (a-1) was dissolved in benzyl alcohol to obtain a solution. The resulting solution was titrated with 1/50 N NaOH benzyl alcohol solution to obtain an acid value.
(Intrinsic Viscosity)
Polyethylene terephthalate (a-2) solutions, each having a concentration of 0.2 g/dL, 0.3 g/dL, and 0.4 g/dL, respectively, were prepared using a mixed solvent (PTM-11, manufactured by Kanto Chemical Co., Inc.). Viscosity of each solution was measured at 25° C. using an Ubbelohde type automatic viscometer (AVL-2C, manufactured by San Denshi Industry Co., Ltd.), and the obtained values were used to make a Huggins plot, and the plot was extrapolated to the concentration of 0 g/dL to obtain an intrinsic viscosity ([$\eta$]).
(Mass Average Molecular Weight)
To 50 ml of THF (reagent grade), 0.025 g of a sample was soaked for 72 hours to completely dissolve the sample and to obtain a solution. The resulting solution was mildly shaken and filtrated. Then, 1 ml of the resulting solution was introduced into a sample container, and mass average molecular weight was measured under the conditions of flow rate of 0.500 mL, injection of 50 μL, measurement temperature of 40° C. and the following configuration using a GPC apparatus (HPLC-8120GPC, manufactured by Tosoh Corporation).
Column: 2 sets of TSK-GEL GMHHR-H 7.8×300; Exclusion limit: 4×10$^8$
Guard column: TSK-GUARDCOLUMN HHR-H 7.5×75
Detector: RI (differential refractometer)
(Tendency to Mold Staining)
A pellet of a thermoplastic resin composition (5 g) was introduced into a test tube (having a diameter of 25 mm and a length of 250 mm), and the aperture of the test tube was covered with a lid of heat resistant glass plate (TEMPAX glass having a length of 55 mm, width of 55 mm, and thickness of 3 mm). Then the test tube was set in a block heater (a high precision constant temperature metal bath, an aluminum dry block bath, dry block series manufactured by Scinics Corporation) and subjected to a heat treatment of 280° C. for 10 minutes. As a result of the heat treatment, an attached matter attributed to thermal decomposition products sublimated from the pellet was observed on the inside wall of the glass plate. Haze of the resulting glass plate was measured with a haze meter (NDH2000, manufactured by Nippon Denshoku Industries Co., Ltd.). When the haze is 1.9 or below, it is thought that the amount of the attached matter originated from volatile components under a high temperature melting state is small and thus the amount of mold-staining is small. The haze is preferably 1.7 or below.
(Amount of THF)
A pellet of a thermoplastic resin composition was cut into small pieces and dried at 140° C. for 2 hours. A hundred milligrams of the resulting pellet were introduced into a headspace vial (20 ml), sealed by a septum with polytetrafluoroethylene sheet, and crimped by an aluminum cap. The resulting vial was set in a block heater (a high precision constant temperature metal bath, an aluminum dry block bath, dry block bath manufactured by Scinics Corporation), and the block heater was covered with aluminum foil and heated at 280° C. for 5 minutes. Then the vial was set in a sampler of gas chromatography. The vial heat-retaining block of the sampler (Shimadzu headspace sampler, HSS-2B; the syringe temperature being set at 150° C.) was set at 200° C. After the vial heat-retaining block was kept for 4 minutes, the gas-phase in the vial was quantitatively analyzed by gas chromatography (with Shimadzu gas chromatograph). As the capillary column, the one with a length of 30 m of DB-WAX, an I.D. of 0.53 mm, and a coating film thickness of 1 μm was used.

When the amount of THF is 100 ppm or lower, it is thought that there is little thermal decomposition of a polyester resin (A) and hence thermal stability of the polyester resin (A) is improved.

(Flowability)

Melt volume rate (MVR) of a pellet of a thermoplastic resin composition was measured at a test temperature of 270° C. and a load of 21N in accordance with the test method of ISO 1133.

When the MVR is 40 cm³/10 minutes or higher, flowability of the thermoplastic resin composition is good and suitable for production of a shaped article having large size and complicated shape. The MVR is more preferably 42 cm³/10 minutes or higher.

(Appearance of Metal Vapor-Deposited Article)

Appearances of a metal vapor-deposited article before and after a heat resistance test were inspected by visual observation and evaluated by the following standard. The heat resistance test was carried out by use of a gear oven (GPH(H)-100, manufactured by Tabai Espec Corporation), in the hot air of 160° C. for 24 hours.

◯: There is no surface roughness, no white irregular pattern such as spots (bleed-out of additives), or no mold release mark.

X: There is surface roughness, white irregular pattern such as spots, or mold release mark.

The mold release mark means a pattern derived from a transfer of convex and concave defects of a mold surface (transfer of convex and concave mold defects) attributed to deteriorated mold releasability of a shaped article, or a feather-like (sometimes a flow mark-like) convex and concave pattern on the surface attributed to shrinkage of a shaped article inside of a mold. It appears as a white pattern after a vapor deposition treatment.

(Fogging Property)

A sample having a length of 100 mm, width of 15 mm, and thickness of 3 mm was cut off from a shaped article obtained by injection molding and introduced into a test tube having a diameter of 30 mm and length of 200 mm. Then, the test tube was set in a fogging tester (fogging tester WSF-2 improved model, manufactured by Suga Test Instruments Co., Ltd.) temperature-adjusted at 160° C. Further, the aperture of the test tube was covered with a lid of heat resistant glass plate (TEMPAX glass having a length of 55 mm, width of 55 mm, and thickness of 3 mm), and heat treatment was carried out at 160° C. for 20 hours. As a result of the heat treatment, an attached matter attributed to thermal decomposition products sublimated from the sample was observed on the inside wall of the glass plate. Haze of the resulting glass plate was measured with a haze meter (NDH2000, manufactured by Nippon Denshoku Industries Co., Ltd.).

The haze is preferably 30% or lower, more preferably 20% or lower, and particularly preferably 10% or lower. When the haze is 30% or lower, there occurs little fogging in the case where the shaped article is used as various lamp components.

(Polybutylene terephthalate (a-1))

TUFPET N1300, manufactured by Mitsubishi Rayon Co., Ltd.; Reduced viscosity (ηsp/C): 1.01; Acid value: 42 meq/kg.

(Polyethylene terephthalate (a-2))

DIANITE MA521H-D, manufactured by Mitsubishi Rayon Co., Ltd.; Intrinsic viscosity [η]: 0.780.

(Cresol Novolac Epoxy Resin (B))

Sumiepoxy ESCN-220HH, manufactured by Sumitomo Chemical Co., Ltd.; Number average molecular weight: 1,200; Epoxy equivalent: 230.

(Bisphenol A Epoxy Resin (B'))

Epicoat 1004K, manufactured by Yuka-Shell Epoxy Co. Ltd.

(Vinyl Cyanide-Aromatic Vinyl Copolymer Containing Epoxy Group (C))

To a reaction vessel, 115 parts by mass of distilled water, 1 part by mass of calcium tertiary phosphate, and 0.001 part of Demol P (manufactured by Kao Corporation) were charged and stirred. To the resulting mixture, a mixture of 23 parts by mass of acrylonitrile, 76.7 parts by mass of styrene, 0.3 part by mass of glycidyl methacrylate, 0.5 part by mass of t-dodecyl mercaptan, 0.17 part by mass of azobisisobutylonitrile, and 0.003 part by mass of Gafac GB-520 (manufactured by TOHO Chemical Industry Co., Ltd.) was added to make a suspension, and the resulting suspension was heated to 75° C. and kept at the same temperature for 240 minutes for completion of the polymerization to obtain an vinyl cyanide-aromatic vinyl copolymer containing epoxy group (C). The monomer ratio of this copolymer was 24.9/74.7/0.4 (mass ratio) with respect to acrylonitrile/styrene/glycidyl methacrylate.

(Vinyl Cyanide-Aromatic Vinyl Copolymer (C'))

To a reaction vessel, 115 parts by mass of distilled water, 1 part by mass of calcium tertiary phosphate, and 0.001 part of Demol P (manufactured by Kao Corporation) were charged and stirred. To the resulting mixture, a mixture of 25 parts by mass of acrylonitrile, 75 parts by mass of styrene, 0.5 part by mass of t-dodecyl mercaptan, 0.17 part by mass of azobisisobutylonitrile, and 0.003 part by mass of Gafac GB-520 (manufactured by TOHO Chemical Industry Co., Ltd.) was added to make a suspension, and the resulting suspension was heated to 75° C. and kept at the same temperature for 240 minutes for completion of the polymerization to obtain a vinyl cyanide-aromatic vinyl copolymer (C'). The monomer ratio of this copolymer was 24.9/75.1 (mass ratio) with respect to acrylonitrile/styrene.

((Meth)acrylate Resin (D))

A polymerization reactor equipped with a stirrer and a condenser was purged with nitrogen, and a mixture of 250 parts by mass of ion exchanged water, 1.5 parts by mass of sodium dioctyl sulfosuccinate, 0.2 part by mass of potassium persulfate, 80 parts by mass of methyl methacrylate, and 20 parts by mass of n-butyl acrylate was charged to it. The inside of the polymerization reactor was purged with nitrogen again, and the polymerization reactor was heated to 65° C. and kept at this temperature for 4 hours to obtain a latex of a (meth) acrylate resin (D). After the latex thus obtained was cooled, an aqueous aluminum chloride solution was added to it for coagulation by salt, and washing and drying of the resulting (meth)acrylate resin (D) was carried out to obtain the (meth) acrylate resin (D). The mass average molecular weight (Mw) of the (meth)acrylate resin (D) was 5,750,000.

(Inorganic Filler (E))

Precipitated barium sulfate, B-30, manufactured by Sakai Chemical Industry Co., Ltd.; Refractive index: 1.64; Average particle diameter: 0.3 μm.

(Another Additive)

Mold releasing agent: Triglyceride montanate, Licowax WE4, manufactured by Clariant (Japan) K.K.

Antioxidant: Phosphite antioxidant, bis(2,6-di-t-butyl-4-methylphenyl)pentaerythritol diphosphite, Adeka Stub PEP-36, manufactured by Adeka Corporation.

Colorant: Carbon Black, Black EXC-8A1772, manufactured by Sumika Color Co., Ltd.

Examples 1 to 8 and Comparative Examples 1 to 13

Each component was compounded in a compounding amount shown in Table 1. The resulting mixture was mixed with V-blender for 5 minutes, homogenized, introduced into a vent type 30 mmφ twin screw extruder (PCM30, manufactured by Ikegai Corporation), and extruded at a cylinder temperature of 270° C. to obtain pellets of a thermoplastic resin composition.

Evaluations of a tendency to mold staining, amount of THF, and flowability were carried out on the above pellets. The results are shown in Table 1.

The above pellets were subjected to injection molding by use of an injection molding apparatus (IS80FPB, manufactured by Toshiba Corporation) and a mold (polished up by #14,000) at a cylinder temperature of 260° C. and a mold temperature of 80° C. to obtain a plate (shaped article) having a length of 100 mm, width of 100 mm, and thickness of 3 mm.

Evaluations of appearance and fogging property were carried out on the above shaped article. The results are shown in Table 1.

Direct aluminum vapor deposition was carried out by the following method on each of shaped articles obtained in the same manner as the ones above.

At first, the shaped article was placed in a vacuum vapor deposition apparatus, then the resulting system was evacuated to about $1 \times 10^{-5}$ Pa, then electric current was applied to a tungsten resistor heater, and then aluminum was evaporated at a high temperature. Aluminum fine particles thus evaporated adhered to the surface of the shaped article and a vapor-deposited film of aluminum was formed on the whole surface. Electric current was applied to the tungsten resistor heater for a predetermined time and a metal vapor-deposited article was obtained. The thickness of the aluminum vapor-deposited film was 80 nm.

The appearances of the above metal vapor-deposited articles were evaluated. The results are shown in Table 1.

(Judgment)

The standard of judgment for evaluation is as follows.

⊚: All the evaluation items are within a preferable range, and a tendency to mold staining, fogging property, and MVR are within a more preferable range.

○: All the evaluation items are within a preferable range.

Δ: Among the evaluation items, one item is out of the preferable range.

X: Among the evaluation items, two or more items are out of the preferable range.

TABLE 1

| | | Ex. 1 | Ex. 2 | Ex. 3 | Ex. 4 | Ex. 5 | Ex. 6 | Ex. 7 | Ex. 8 | C. 1 | C. 2 | C. 3 | C. 4 |
|---|---|---|---|---|---|---|---|---|---|---|---|---|---|
| PEs resin | (a-1) PBT resin | 85 | 85 | 85 | 85 | 85 | 85 | 85 | 85 | 85 | 85 | 85 | 85 |
| (A) | (a-2) PET resin | 15 | 15 | 15 | 15 | 15 | 15 | 15 | 15 | 15 | 15 | 15 | 15 |
| Cresol novolac epoxy resin (B) | | 0.1 | 1.0 | 1.0 | 1.0 | 2.5 | 2.5 | 2.5 | 3.0 | — | — | — | — |
| Bisphenol A epoxy resin (B') | | — | — | — | — | — | — | — | — | 1.0 | — | — | — |
| AS containing epoxy group (C) | | 6.3 | 4.2 | 8.4 | 12 | 2.1 | 4.2 | 8.4 | 6.3 | 4.2 | — | 4.2 | 8.4 |
| AS (C') | | 2.1 | 4.2 | — | — | 6.3 | 4.2 | — | 2.1 | 4.2 | — | 4.2 | — |
| (Meth)acrylate ester resin (D) | | 1.2 | 1.2 | 1.2 | 1.2 | 1.2 | 1.2 | 1.2 | 1.2 | 1.2 | 1.2 | 1.2 | 1.2 |
| Inorganic filler (E) | Precipitated barium sulfate (0.3 μm) | 10.0 | 10.0 | 10.0 | 10.0 | 10.0 | 10.0 | 10.0 | 10.0 | 10.0 | 10.0 | 10.0 | 10.0 |
| Others | Triglyceride montanate | 0.20 | 0.20 | 0.20 | 0.20 | 0.20 | 0.20 | 0.20 | 0.20 | 0.20 | 0.20 | 0.20 | 0.20 |
| | Phosphite antioxidant | 0.1 | 0.1 | 0.1 | 0.1 | 0.1 | 0.1 | 0.1 | 0.1 | 0.1 | 0.1 | 0.1 | 0.1 |
| | Carbon black | 1.5 | 1.5 | 1.5 | 1.5 | 1.5 | 1.5 | 1.5 | 1.5 | 1.5 | 1.5 | 1.5 | 1.5 |
| Mold-staining haze [%] (280° C. × 10 min) | | 1.8 | 1.3 | 1.5 | 1.9 | 1.8 | 1.6 | 1.3 | 1.3 | 2.2 | 2.3 | 2.0 | 1.8 |
| Fogging haze [%] (160° C. × 20 hr) | | 9.5 | 3.0 | 2.9 | 18 | 4.5 | 3.8 | 3.5 | 3.9 | 10 | 13 | 11 | 9.8 |
| MVR (270° C./21N)[cm³/10 min] | | 49 | 43 | 42 | 42 | 42 | 41 | 40 | 40 | 50 | 61 | 59 | 57 |
| Amount of THF [ppm] | | 93 | 56 | 36 | 35 | 68 | 49 | 34 | 34 | 137 | 249 | 194 | 171 |
| Appearance of vapor deposited article (before heat resistance test) | | ○ | ○ | ○ | ○ | ○ | ○ | ○ | ○ | ○ | ○ | ○ | ○ |
| Appearance of vapor deposited article (after heat resistance test) | | ○ | ○ | ○ | ○ | ○ | ○ | ○ | ○ | ○ | X | ○ | ○ |
| Judgment | | ○ | ⊚ | ⊚ | ○ | ○ | ○ | ○ | ○ | X | X | X | Δ |

| | | C. 5 | C. 6 | C. 7 | C. 8 | C. 9 | C. 10 | C. 11 | C. 12 | C. 13 |
|---|---|---|---|---|---|---|---|---|---|---|
| PEs resin | (a-1) PBT resin | 85 | 85 | 85 | 85 | 85 | 85 | 85 | 85 | 85 |
| (A) | (a-2) PET resin | 15 | 15 | 15 | 15 | 15 | 15 | 15 | 15 | 15 |
| Cresol novolac epoxy resin (B) | | 1.0 | 2.5 | 5.0 | 5.0 | 5.0 | — | 1.0 | 2.5 | 5.0 |
| Bisphenol A epoxy resin (B') | | — | — | — | — | — | — | — | — | — |
| AS containing epoxy group (C) | | — | — | — | 4.2 | 8.4 | 15 | 15 | 15 | 15 |
| AS (C') | | — | — | — | 4.2 | — | — | — | — | — |
| (Meth)acrylate ester resin (D) | | 1.2 | 1.2 | 1.2 | 1.2 | 1.2 | 1.2 | 1.2 | 1.2 | 1.2 |
| Inorganic filler (E) | Precipitated barium sulfate (0.3 μm) | 10.0 | 10.0 | 10.0 | 10.0 | 10.0 | 10.0 | 10.0 | 10.0 | 10.0 |
| Others | Triglyceride montanate | 0.20 | 0.20 | 0.20 | 0.20 | 0.20 | 0.20 | 0.20 | 0.20 | 0.20 |
| | Phosphite antioxidant | 0.1 | 0.1 | 0.1 | 0.1 | 0.1 | 0.1 | 0.1 | 0.1 | 0.1 |
| | Carbon black | 1.5 | 1.5 | 1.5 | 1.5 | 1.5 | 1.5 | 1.5 | 1.5 | 1.5 |
| Mold-staining haze [%] (280° C. × 10 min) | | 1.5 | 1.4 | 1.4 | 1.4 | 1.4 | 3.5 | 3.1 | 2.9 | 2.9 |
| Fogging haze [%] (160° C. × 20 hr) | | 3.3 | 4.8 | 5.8 | 5.4 | 4.8 | 43 | 37 | 32 | 31 |
| MVR (270° C./21N)[cm³/10 min] | | 45 | 42 | 33 | 32 | 31 | 55 | 43 | 38 | 32 |
| Amount of THF [ppm] | | 163 | 127 | 68 | 40 | 31 | 189 | 34 | 31 | 30 |
| Appearance of vapor deposited article (before heat resistance test) | | ○ | ○ | ○ | ○ | ○ | ○ | ○ | ○ | ○ |

TABLE 1-continued

| | | | | | | | | | |
|---|---|---|---|---|---|---|---|---|---|
| Appearance of vapor deposited article (after heat resistance test) | X | X | X | X | X | X | X | X | X |
| Judgment | Δ | Δ | Δ | Δ | Δ | X | X | X | X |

Abbreviation
Ex.: Example; C.: Comparative Example

INDUSTRIAL APPLICABILITY

The thermoplastic resin composition of the present invention is useful for vehicle lamp components, in particular, for materials for extensions.

What is claimed is:

1. A thermoplastic resin composition, comprising:
a polyester resin (A);
a cresol novolac epoxy resin (B);
a vinyl cyanide-aromatic vinyl copolymer containing epoxy group (C), and
a (meth)acrylate resin (D),
wherein a compounding amount of the cresol novolac epoxy resin (B) is 0.01 to 1 parts by mass, a compounding amount of the vinyl cyanide-aromatic vinyl copolymer containing epoxy group (C) is 2 to 9 parts by mass, and a compounding amount of the (meth)acrylate resin (D) is 0.1 to 10 parts by mass, relative to 100 parts by mass of the polyester resin (A), and
wherein the content of methyl methacrylate units is 30% by mass or more in 100% by mass of the (meth)acrylate resin (D),
wherein the mass average molecular weight of the (meth)acrylate resin (D) is 600,000 or more.

2. The thermoplastic resin composition according to claim 1, further comprising an inorganic filler (E) in a compounding amount of 0.1 to 45 parts by mass relative to 100 parts by mass of the polyester resin (A).

3. A shaped article shaped from the thermoplastic resin composition according to claim 1.

4. The shaped article according to claim 3, wherein the shaped article is a vehicle lamp component.

5. The thermoplastic resin composition according to claim 1, wherein the polyester resin (A) is a combination of polybutylene terephthalate (a-1) and polyethylene terephthalate (a-2), and the polyethylene terephthalate (a-2) has an intrinsic viscosity ([η]) of 0.6 to 1.2.

6. The thermoplastic resin composition according to claim 1, wherein the polyester resin (A) is a combination of polybutylene terephthalate (a-1) and polyethylene terephthalate (a-2), and the polyethylene terephthalate (a-2) has an intrinsic viscosity ([η]) of 0.6 to 1.1.

7. The thermoplastic resin composition according to claim 1, wherein the polyester (A) is a combination of polybutylene terephthalate (a-1) and polyethylene terephthalate (a-2),
wherein the amount of polybutylene terephthalate (a-1) is 55% to 95% by mass and the amount of polyethylene terephthalate (a-2) is 5% to 45% by mass wherein the mass % of said polybutylene terephthalate (a-1) and polyethylene terephthalate (a-2) is based on 100% by mass of the polyester resin (A).

8. The thermoplastic resin composition according to claim 7, wherein the amount of polybutylene terephthalate (a-1) is 60% to 90% by mass and the amount of polyethylene terephthalate (a-2) is 10% to 40% by mass wherein the mass % of said polybutylene terephthalate (a-1) and polyethylene terephthalate (a-2) is based on 100% by mass of the polyester resin (A).

9. The thermoplastic resin composition according to claim 7, wherein the amount of polybutylene terephthalate (a-1) is 70% to 85% by mass and the amount of polyethylene terephthalate (a-2) is 15% to 30% by mass wherein the mass % of said polybutylene terephthalate (a-1) and polyethylene terephthalate (a-2) is based on 100% by mass of the polyester resin (A).

10. The thermoplastic resin composition according to claim 7, wherein polybutylene terephthalate (a-1) has a reduced viscosity ($\eta$sp/C) at 25° C. of 0.7 to 2.0.

11. The thermoplastic resin composition according to claim 10, wherein polybutylene terephthalate (a-1) has a reduced viscosity ($\eta$sp/C) at 25° C. of 0.8 to 1.7.

12. The thermoplastic resin composition according to claim 1, wherein the polyester resin (A) is in an amount ranging from 80% by mass to 98% by mass based on 100% by mass of the thermoplastic resin composition.

13. The thermoplastic resin composition according to claim 1, wherein the polyester resin (A) is in an amount ranging from 85% by mass to 97% by mass based on 100% by mass of the thermoplastic resin composition.

14. The thermoplastic resin composition according to claim 1, wherein the polyester resin (A) is in an amount ranging from 90% by mass to 97% by mass based on 100% by mass of the thermoplastic resin composition.

15. The thermoplastic resin composition according to claim 1, wherein the cresol novolac epoxy resin (B) is in an amount of 0.03 part by mass to 1 parts by mass relative to 100 parts by mass of the polyester resin (A).

16. The thermoplastic resin composition according to claim 1, wherein the cresol novolac epoxy resin (B) is in an amount of 0.05 part by mass to 1 parts by mass relative to 100 parts by mass of the polyester resin (A).

17. The thermoplastic resin composition according to claim 1, wherein vinyl cyanide-aromatic vinyl copolymer containing epoxy group (C) is in an amount of 2.5 parts by mass to 9 parts by mass relative to 100 parts by mass of the polyester resin (A).

18. The thermoplastic resin composition according to claim 1, wherein vinyl cyanide-aromatic vinyl copolymer containing epoxy group (C) is in an amount of 3 parts by mass to 9 parts by mass relative to 100 parts by mass of the polyester resin (A).

* * * * *